(12) United States Patent
Mbadinga-Mouanda et al.

(10) Patent No.: US 10,632,412 B2
(45) Date of Patent: Apr. 28, 2020

(54) FILTER ELEMENT OF A FILTER FOR FILTERING FLUIDS, AND A METHOD OF MANUFACTURING THE FILTER ELEMENT

(71) Applicant: MANN+HUMMEL GmbH, Ludwigsburg (DE)

(72) Inventors: Gelase Mbadinga-Mouanda, Bietigheim-Bissingen (DE); Klaus Gehwolf, Mamming (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 94 days.

(21) Appl. No.: 15/904,728

(22) Filed: Feb. 26, 2018

(65) Prior Publication Data

US 2018/0178156 A1 Jun. 28, 2018

Related U.S. Application Data

(63) Continuation of application No. 14/492,286, filed on Sep. 22, 2014, now Pat. No. 9,919,256, which is a
(Continued)

(30) Foreign Application Priority Data

Sep. 7, 2009 (DE) .................. 10 2009 040 202
Mar. 21, 2012 (DE) .................. 10 2012 005 532

(51) Int. Cl.
*B01D 46/52* (2006.01)

(52) U.S. Cl.
CPC ......... *B01D 46/521* (2013.01); *B01D 46/523* (2013.01); *B01D 2201/127* (2013.01)

(58) Field of Classification Search
CPC ................ B01D 46/521; B01D 46/523; B01D 46/0001; B01D 2201/127
See application file for complete search history.

(56) References Cited

U.S. PATENT DOCUMENTS 5,804,014 A * 9/1998 Kahler ................. B01D 29/012
156/204
6,165,241 A * 12/2000 Choi .................... B01D 29/012
55/521
(Continued)

FOREIGN PATENT DOCUMENTS

| DE | 4345121 A1 | 7/1995 |
| EP | 1059108 A1 | 12/2000 |
| WO | 02055179 A1 | 7/2002 |

*Primary Examiner* — Robert Clemente
(74) *Attorney, Agent, or Firm* — James Hasselbeck

(57) ABSTRACT

A filter element has a zigzag-folded filter medium. Filter medium sections joined by a fold edge define an intermediate fold space, respectively, with a fold base and fold peaks opposite the fold base. An elongate support section is arranged in the intermediate fold space on a filter medium surface of one of the filter medium sections. The support section extends perpendicular to the fold edges between fold base and fold peak. The support section has a height extension perpendicular to the filter medium surface that increases in longitudinal direction of the support section from fold base to fold peak. The support section has a free side facing away from the filter medium surface. The support section has a width extension parallel to the fold edges. The width extension decreases parallel to the filter medium surface and perpendicular to the longitudinal direction from fold peak to fold base.

20 Claims, 8 Drawing Sheets

Related U.S. Application Data continuation of application No. PCT/EP2013/051087, filed on Jan. 22, 2013, and a continuation-in-part of application No. 13/413,778, filed on Mar. 7, 2012, now Pat. No. 8,479,924, which is a continuation of application No. PCT/EP2010/063132, filed on Sep. 7, 2010.

(56) References Cited

U.S. PATENT DOCUMENTS

| | | |
|---|---|---|
| 8,746,462 B2 | 6/2014 | Mbadinga-Mouanda et al. |
| 2005/0139544 A1* | 6/2005 | Choi ................. B01D 46/0001 210/493.1 |
| 2006/0005517 A1* | 1/2006 | Sundet ............... B01D 46/0001 55/497 |
| 2010/0275559 A1 | 11/2010 | Steins et al. |
| 2011/0314782 A1* | 12/2011 | Morita ................. B01D 46/523 55/500 |
| 2012/0223008 A1* | 9/2012 | Mbadinga-Mouanda ................... B01D 46/521 210/493.5 |
| 2013/0133517 A1 | 5/2013 | Gehwolf et al. |
| 2014/0223872 A1* | 8/2014 | Bao ........................ B01D 39/16 55/486 |

\* cited by examiner

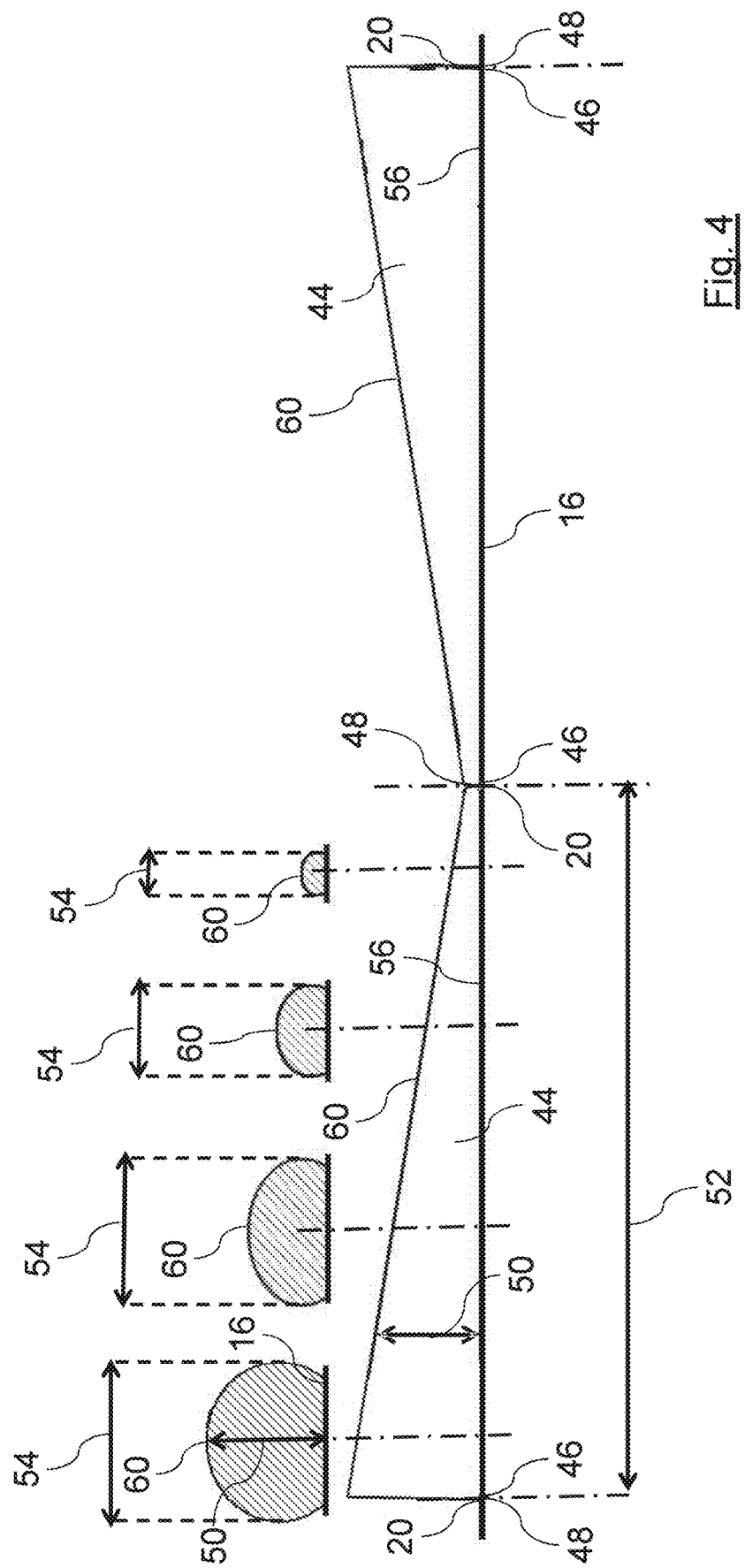

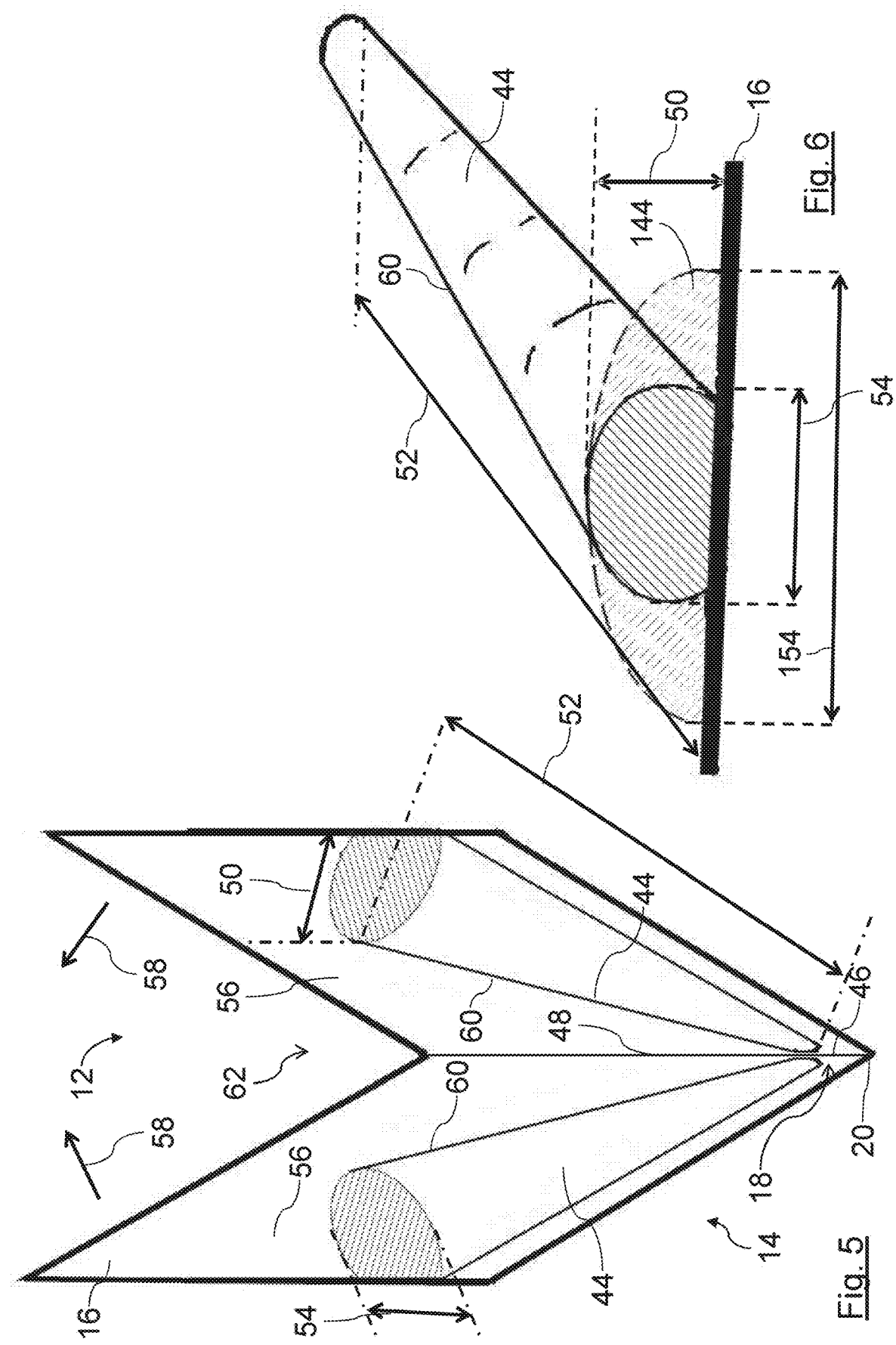

# FILTER ELEMENT OF A FILTER FOR FILTERING FLUIDS, AND A METHOD OF MANUFACTURING THE FILTER ELEMENT

CROSS-REFERENCE TO RELATED APPLICATIONS

This application is a continuation of U.S. application Ser. No. 14/492,286, filed 22 Sep. 2014, which is a continuation application of international application No. PCT/EP2013/051087 having an international filing date of 22 Jan. 2013 and designating the United States, the international application claiming a priority date of 21 Mar. 2012, based on prior filed German patent application No. 10 2012 005 532.3. U.S. application Ser. No. 14/492,286 is a Continuation in Part of U.S. application Ser. No. 13/413,778, filed 7 Mar. 2012, now U.S. Pat. No. 8,479,924 issued 9 Jul. 2013, which is a continuation of international application No. PCT/EP2010/063132, filed 7 Sep. 2010 which claims priority to German patent application No. 10 2009 040 202.0, filed 7 Sep. 2009. The entire contents of the aforesaid US applications, international applications and the aforesaid German patent applications being incorporated herein by reference.

BACKGROUND OF THE INVENTION

The invention concerns a filter element of a filter for filtering fluids, in particular gases, in particular intake air, in particular of an internal combustion engine, in particular of a motor vehicle, comprising a zigzag-folded filter medium with a raw fluid side and a clean fluid side, wherein at the raw fluid side and/or at the clean fluid side of the filter medium at least one elongate support section is arranged on an appropriate surface of the filter medium that, at least sectionwise, extends at a slant or perpendicular to fold edges of the filter medium, wherein a height extension of the at least one support section increases perpendicular to the surface of the filter medium along its longitudinal direction in the direction from a fold base to a fold peak of a fold of the filter medium so that, when the filter medium is folded, the at least one support section with its free side which is facing away from the surface of the filter medium is resting, respectively, on a corresponding free side of a support section oppositely positioned in an intermediate fold space or on the surface of a filter medium section oppositely positioned in the intermediate fold space.

Moreover, the invention concerns a filter for filtering fluids, in particular gases, in particular intake air, in particular of an internal combustion engine, in particular of a motor vehicle, comprising a filter element, in particular a filter element according to the invention, comprising a zigzag-folded filter medium with a raw fluid side and a clean fluid side, wherein at the raw fluid side and/or at the clean fluid side of the filter medium at least one elongate support section is arranged on an appropriate surface of the filter medium that, at least sectionwise, extends at a slant or perpendicular to fold edges of the filter medium, wherein a height extension of the at least one support section increases perpendicular to the surface of the filter medium along its longitudinal direction in the direction from a fold base to a fold peak of the fold of the filter medium so that, when the filter medium is folded, the at least one support section with its free side which is facing away from the surface of the filter medium is resting, respectively, on a corresponding free side of a support section oppositely positioned in an intermediate fold space or on the surface of a filter medium section oppositely positioned in the intermediate fold space.

WO 2011/026999 A1 discloses a filter for filtering fluids, comprising a filter element with a zigzag-folded filter medium with a raw side and a clean side. At the raw side and/or at the clean side of the filter medium, a plurality of elongate adhesive sections are arranged along at least two adhesive beads on the filter medium that, at least sectionwise, extend at a slant or perpendicular to the fold edges. Each adhesive bead has at least one adhesive section and at least one adhesive interruption arranged thereat. The extension of the adhesive sections perpendicular to the filter medium along the adhesive bead varies so that, when the filter medium is folded, the adhesive sections respectively are resting flat with the free side facing away from the filter medium on an appropriate free side of an adhesive section oppositely positioned in the intermediate fold space or on the surface of a filter medium section oppositely positioned in the intermediate fold space in a flat arrangement.

The invention has the object to design a filter element and a filter of the aforementioned kind in which the at least one support section can be realized with a manufacturing expenditure and material expenditure as minimal as possible. In particular, the at least one support section should be realized as much as possible in a space-saving manner. The ratio of effective filter surface area to total surface area of the filter medium should be as large as possible.

SUMMARY OF THE INVENTION

This object is solved according to the invention in that a width extension of the at least one support section decreases parallel to the surface of the filter medium and perpendicular to its length extension in the direction of the fold peak to the fold base of the fold of the filter medium.

According to the invention, the at least one support section has thus, viewed from the fold peak, a cross-section that tapers as a whole. The width extension is to be understood as the width of an appropriate cross-section of the support section in a cross-sectional plane perpendicular to the longitudinal direction. Accordingly, the height extension is the height of the appropriate cross-section of the support section in this cross-sectional plane. A length extension is the maximum length of the support section. The surface area of the filter medium which is covered by the at least one support section is reduced as a whole. Accordingly, the effective filter surface area of the filter medium for the same total surface area is enlarged. Also, less material for realizing the support section is required in this way. This leads furthermore to weight savings for the filter element. Moreover, tapering of the at least one support section causes the free volume in the intermediate fold space to be enlarged. The load limit of the filter element is thus increased and thus also its service life. Advantageously, a length extension of the at least one support section in an intermediate fold space can be between approximately 250 mm and approximately 400 mm, preferably approximately 280 mm. The width extension at the widest point can be advantageously approximately 1 mm and approximately 3 mm, preferably approximately 2 mm. The height extension at the highest point can advantageous be between approximately 0.8 mm and approximately 2 mm, preferably approximately 1.2 mm. At the narrowest point, the width extension can be between approximately 0.3 mm and 0.6 mm, preferably approximately 0.45 mm. The height extension at the lowest point can be approximately 0.6 mm and 0.9 mm, preferably approximately 0.75 mm. By the tapering shape of the support section toward the fold base, possibly existing inner mechanical stress, which can lead to the intermediate space being forced apart at the fold base, can be reduced. In this way, the shape of the intermediate fold spaces can be optimized.

In an advantageous embodiment, the at least one support section can have at least on the side which is facing away from the filter medium a cross-section similar to a segment of a circular or elliptical surface. The at least one support section as a whole can thus have approximately the shape of a cone or of a truncated cone with an approximately circular or elliptical base surface. The base surface and thus the conical envelope or truncated cone envelope can be flattened at the side which is facing the filter medium and/or at the side that is facing the oppositely positioned support section or the surface of the filter medium section oppositely positioned within the intermediate fold space. In this way, the width in the direction of the width extension of a contact surface of its free side facing away from the surface of the filter medium in contact with a corresponding surface of the oppositely positioned support section in the intermediate fold space or the filter medium section positioned oppositely in the intermediate fold space can be minimized. The support section moreover can be applied in a simple way, in particular by means of a nozzle, onto the filter medium. A circular or elliptical cross-section can be simply realized. When erecting the folds, the at least one support section can be pressed simply with its free side against the oppositely positioned support section or the oppositely positioned filter medium section. When doing so, still soft uncured material of which the at least one support section is formed can be flattened by the pressing action to a predetermined degree upon erecting the folds. In this way, the contact surface can be varied in regard to its width.

In a further advantageous embodiment, a ratio of the height extension of the at least one support section to the width extension can be approximately constant across the length extension. The ratio of the height extension to the width extension can be influenced easily in particular by pre-determining the material of which the support section is formed; a geometry of a tool for applying the material, in particular a nozzle geometry; an application rate with which the material of the support section is applied onto the filter medium; the material and properties of the filter medium; and/or a metering head of a nozzle. With a constant ratio of height extension to width extension, a uniform support section can be realized. With the uniform support section a uniform support function can be realized. A uniform support section can lead to a uniform flow course of the fluid in the intermediate fold spaces.

Advantageously, the ratio of height extension to width extension can be between approximately 1/5 to approximately 5/5, preferably greater than approximately 3/5. Experiments have shown that in this way an optimal support function of the at least one support section with an effective filter surface that is as large as possible can be realized.

In a further advantageous embodiment, the at least one support section can extend across at least one fold edge. Advantageously, the at least one support section can extend across a fold edge of a fold peak. In this way, the folds can be further stabilized by at least one support section. Also, the application of the at least one support section can be simplified. The material supply must not be interrupted in the area of the fold edge. In the area of the fold edge, the ratio of height extension to width extension can be reduced in comparison to the remaining area of the fold. For example, it can be prevented in the area of the fold base that excess material for the support section leads to widening of the intermediate fold space located thereat. In the area of a fold tip it can thus be prevented that the at least one support section projects too far past the fold medium externally to the fold bellows.

Moreover, advantageously, the at least one support section in a fold base does not extend across the fold edge located thereat. In this way, it can be avoided that the at least one support section will force apart the filter medium sections oppositely positioned in the intermediate fold space in the area of the fold base. It can thus be prevented that the support section in the area of the fold base has an undesirable effect on the form of the fold. Advantageously, the at least one support section can end at a spacing of at least 1 mm, preferably more than 1.5 mm, away from the fold edge at the fold base. In this way, it can be prevented that a possible excess of material for realizing the support section leads to bulging or widening of the intermediate fold space. This could have a negative effect on the optimal shape of the fold.

Advantageously, the folds of the filter medium can be approximately V-shaped. With V-shaped folds a pressure gradient between the raw fluid side and the clean fluid side can be reduced upon operation of the filter element. Also, with V-shaped folds an optimal load capacity of the filter element can be achieved.

In a further advantageous embodiment, in the intermediate fold space sides of the at least one support section and of the oppositely positioned support section or of the oppositely positioned filter medium section that are resting on each other can be glued to each other. By an adhesive connection, an optimal connection of the sides can be realized. Moreover, seal-tight connections can also be realized with an adhesive connection. An adhesive connection can be realized in a simple way. In particular, the support section can be made of a material which upon erecting the folds is still adhesive and thereby generates an adhesive action. After erecting, the material can dry and cure and stabilize the adhesive connection. Alternatively, before erecting the folds a separate adhesive medium can be applied onto the at least one support section and/or the oppositely positioned support section and/or the oppositely positioned filter medium section.

Advantageously, in the intermediate fold space, sides of the at least one support section and of the oppositely positioned support section or of the oppositely positioned filter medium section that are resting on each other can have an areal contact with each other in the direction of the width extension and in the direction of the length extension. In contrast to a linear contact, in case of an areal contact the course of the oppositely positioned surfaces in the direction of the width extension and in the direction of the length extension are matched to each other, which is detectable clearly with the naked eye. With an areal contact an optimal connection can be realized. In this way, the support forces which are transmitted by means of the support section can be transmitted uniformly.

In a further advantageous embodiment, the at least one support section in the longitudinal direction can have at least one interruption. By means of the at least one interruption, the fluid to be filtered can pass from one side of the support section to the other. A flow course of the fluid in the intermediate fold spaces can thus be positively influenced. In the interruptions, flow areas are realized in which the fluid to be filtered can be guided substantially perpendicular to the fold edges. In this way, flow areas can be loaded uniformly with fluid. Accordingly, compensation flows between neighboring flow areas which are separated from each other by the at least one support section can be enabled. These fluid connections which are realized by the interruptions can provide for a pressure distribution as uniformly as possible between the flow areas.

Advantageously, the interruptions of support sections which are arranged on opposite sides of the filter medium or on one side of the filter medium adjacent to each other can be displaced relative to each other. Advantageously, at the raw fluid side and at the clean fluid side, segments of the support sections can be arranged such that at least one of the segments at the raw fluid side projects past at least one of the interruptions at the clean fluid side in longitudinal direction at both ends and with its ends overlaps the segments of the support section at the clean fluid side bordering the interruption, and/or at least one of the segments of the support section at the clean fluid side projects past at least one of the interruptions at the raw fluid side at both ends and with its ends overlaps the segments of the support section at the raw fluid side bordering the interruption. Due to the mutually overlapping support section segments at the clean fluid side as well as at the raw fluid side the stability of the folds as a whole can be increased. Accordingly, gaps in the support action of the filter medium can be avoided. The overlap of the support sections can improve a force transmission of the support sections at the clean fluid side onto the appropriate support sections at the raw fluid side.

In a further advantageous embodiment, the at least one support section can be realized of an adhesive, in particular a hot melt, in particular based on polyamide, polyolefin, ethylene vinyl acetate (EVA). With an adhesive, the at least one support section can be applied in a simple and fast way onto the filter medium. For this purpose, in particular nozzle arrangements can be used. By employing an adhesive for realizing the at least one support section, the use of a separate adhesive for gluing the free side of the support section to the oppositely positioned support section or the oppositely positioned filter medium section is obsolete. A hot melt can be heated simply for processing and thus be softened. Upon cooling, the hot melt dries and cures. A support section realized of an adhesive can also be referred to as a glue bead.

Advantageously, the at least one support section can be applied of a foamed adhesive. In this way, the quantity of required adhesive can be reduced. Preferably, at least 50% of the volume of the at least one support section can be formed by gas inclusions. The gas inclusions are produced during foaming. By foaming of the adhesive, the flexibility of the at least one support section can be improved. The foamed adhesive can have a tendency to expand. This can improve the seal tightness of the connection of the at least one support section with the surface of the oppositely positioned support section or the oppositely positioned filter medium section. Moreover, foamed adhesive can cure faster than adhesive that is not foamed. In this way, the production rate can be increased. In particular upon application of the adhesive with a nozzle onto a continuous filter medium web, the web velocity can be increased. Foamed adhesive material can be pressed on, when erecting the folds, with minimal force expenditure in comparison to adhesive that is not foamed. A force action of excessive adhesive onto the folds can thus be reduced. This can have a positive effect on maintaining the desired fold shape. Moreover, penetration of possibly porous or uneven surfaces of the filter medium can be improved with foamed adhesive. Foamed adhesive can penetrate deeper into pores of the surface than adhesive that is not foamed. Filling properties of the adhesive can thus be improved. Structural unevenness of the filter medium can be compensated with foamed adhesive. Moreover, foamed adhesive can be applied also onto surfaces that are slanted or vertical relative to the horizontal. Thixotropic properties of the at least one support section can be improved with foamed adhesive. As a whole, the use of foamed adhesive can reduce the production expenditure, in particular production time, and the material expenditure.

The technical object is further solved for the filter according to the invention in that a width extension of the at least one support section parallel to the surface of the filter medium and perpendicular to its longitudinal direction increases in the direction from the fold base to the fold peak of the fold of the filter medium. The advantages and features disclosed above in connection with the filter element according to the invention apply likewise to the filter according to the invention.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims also individually and combine them to other meaningful combinations.

FIG. 4 shows a side view of a detail of the filter medium of the filter bellows of FIG. 4 after application of the support glue beads on a side of the filter medium and before erecting the folds.

FIG. 5 shows an isometric detail view of the filter medium of FIG. 4 in a phase during erection of the folds.

FIG. 6 is an isometric illustration of a part of the support glue bead of the filter bellows of FIGS. 3 to 5.

In the Figures, same components are provided with same reference characters.

DESCRIPTION OF PREFERRED EMBODIMENTS

Figure 1:
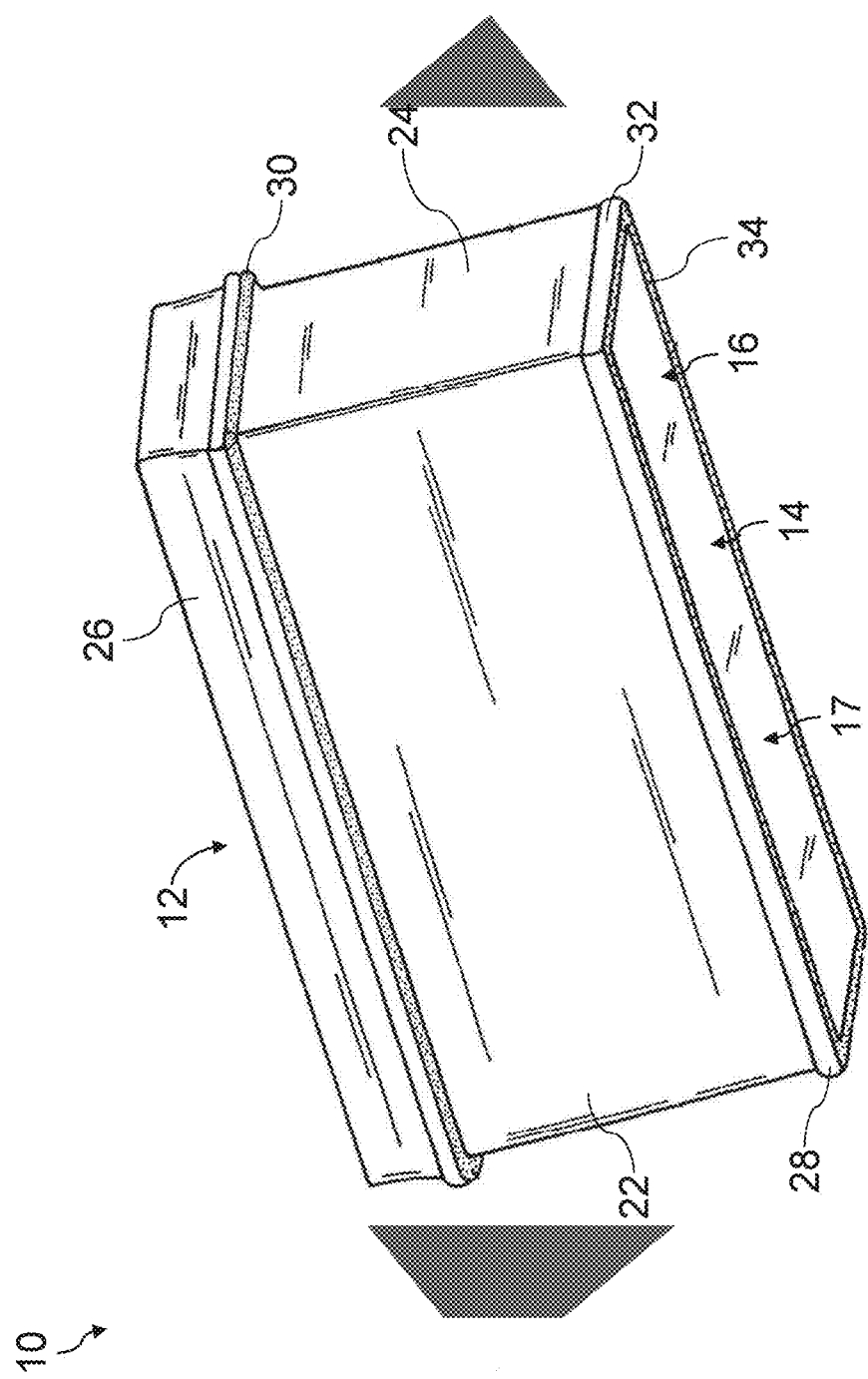
FIG. 1 shows an isometric illustration of a fluid filter according to a first embodiment.

In FIG. 1, a filter element 10 according to a first embodiment is shown. The filter element can be mounted in a filter housing, not shown, of a filter for a fluid. With the filter element 10 gaseous or liquid fluids can be filtered. For example, such a filter element 10 can be used in an air filter of an internal combustion engine of a motor vehicle.

Figure 3:
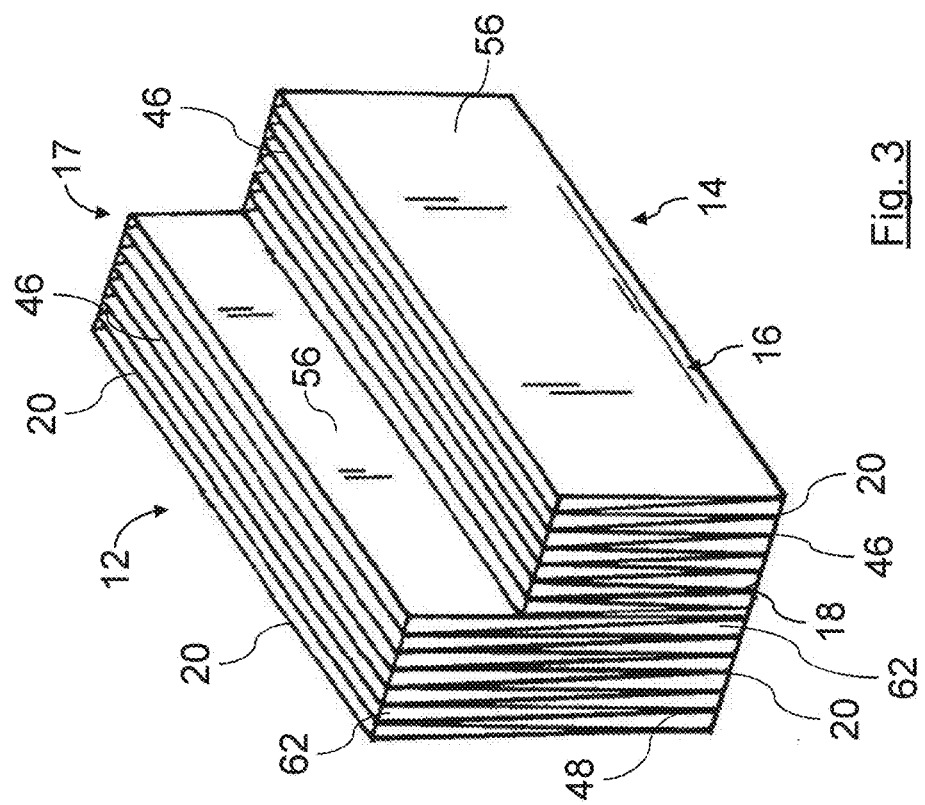
FIG. 3 is an isometric illustration of a filter bellows of a fluid filter with the zigzag-shaped folded filter medium as it is used in the fluid filters of FIGS. 1 and 2.

The filter element 10 has an inflow side 12 at the raw fluid side and an outflow side 14 at the clean fluid side. The filter element 10 comprises a filter bellows 17 of filter medium 16 that is zigzag-folded multiple times. A detail of the filter bellows 17 is shown in FIG. 3. Folds 18 of the filter medium 16 extend between the inflow side 12 and the outflow side 14. A fold peak 20 of a fold 18 is positioned at the inflow side 12 and at the outflow side 14, respectively. Lateral surfaces 22 of the filter element 10 that cannot be flowed through are surrounded by a polyester nonwoven which is provided on the side that is facing the filter element 10 with a hot melt layer. This hot melt layer provides an areal adhesive connection of the polyester nonwoven with the filter element 10 whereby also end faces 24 of the filter bellows 17 are sealed. The filter element 10 comprises a main frame 26 and an auxiliary frame 28. The main frame 26 supports an axial seal 30 which seals in the direction toward the outflow side 14 and is introduced into a groove of the main frame 26 or into a groove between main frame 26 and lateral surfaces 22. The auxiliary frame 28 is connected with the lateral surfaces 22 by an adhesive connection and has radial surfaces 32 and axial surfaces 34 for supporting the filter element 10 in a filter housing, not illustrated.

Figure 2:
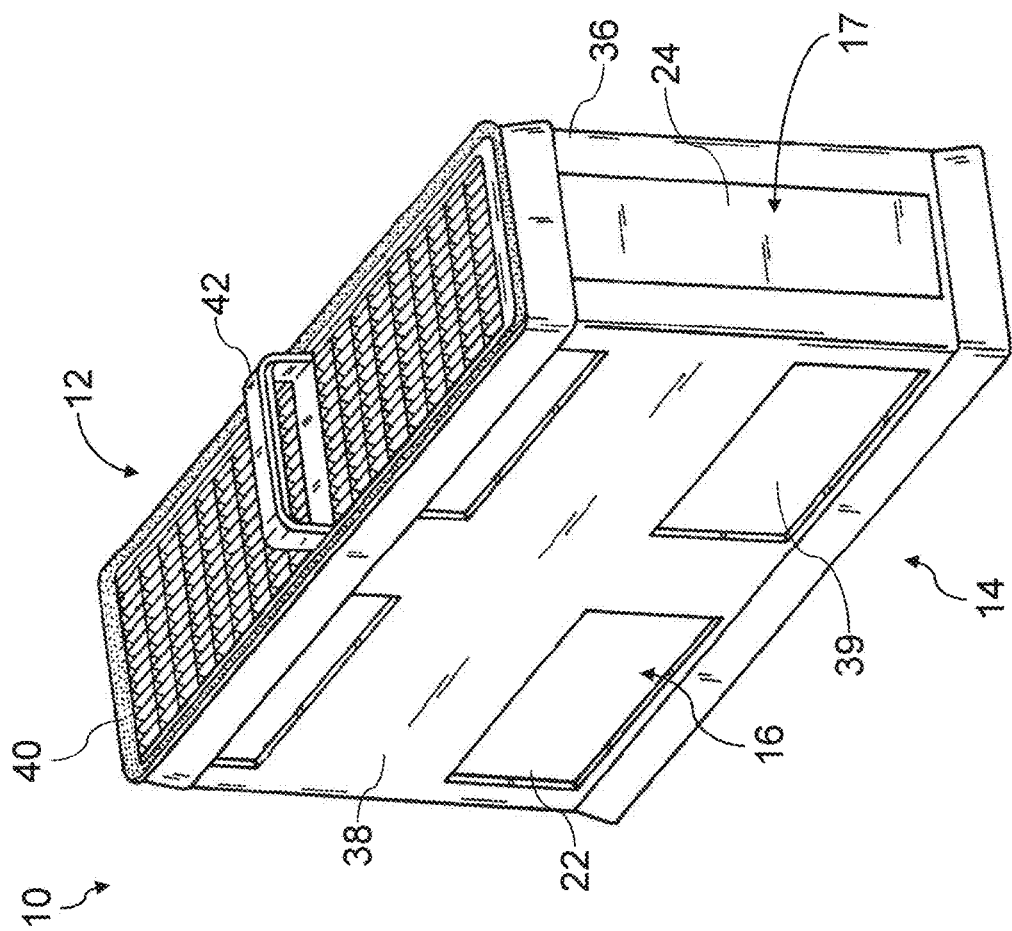
FIG. 2 shows an isometric illustration of a fluid filter according to a second embodiment.

FIG. 2 shows a further embodiment of a filter element 10 which is similar to the first embodiment of FIG. 1. Those elements that are similar to those of the first embodiment of FIG. 1 are provided with the same reference characters. In the second embodiment, at the lateral surfaces 22 of the filter medium 16 that cannot be flowed through, a plastic frame 36 is applied by means of the hot melt connection. On the end faces 24, the sealing action at the end face 24 is realized also by means of the hot melt. Openings 39 are introduced into the plastic frame 36 at the end sides 38. The plastic frame 36 supports on the inflow side 12 an axial seal 40 which can be brought into engagement with a corresponding sealing surface of the filter housing, not shown. Moreover, a handle 42 is provided which is connected to the plastic frame 36 and which serves for improved handling of the filter element 10.

Figure 7:
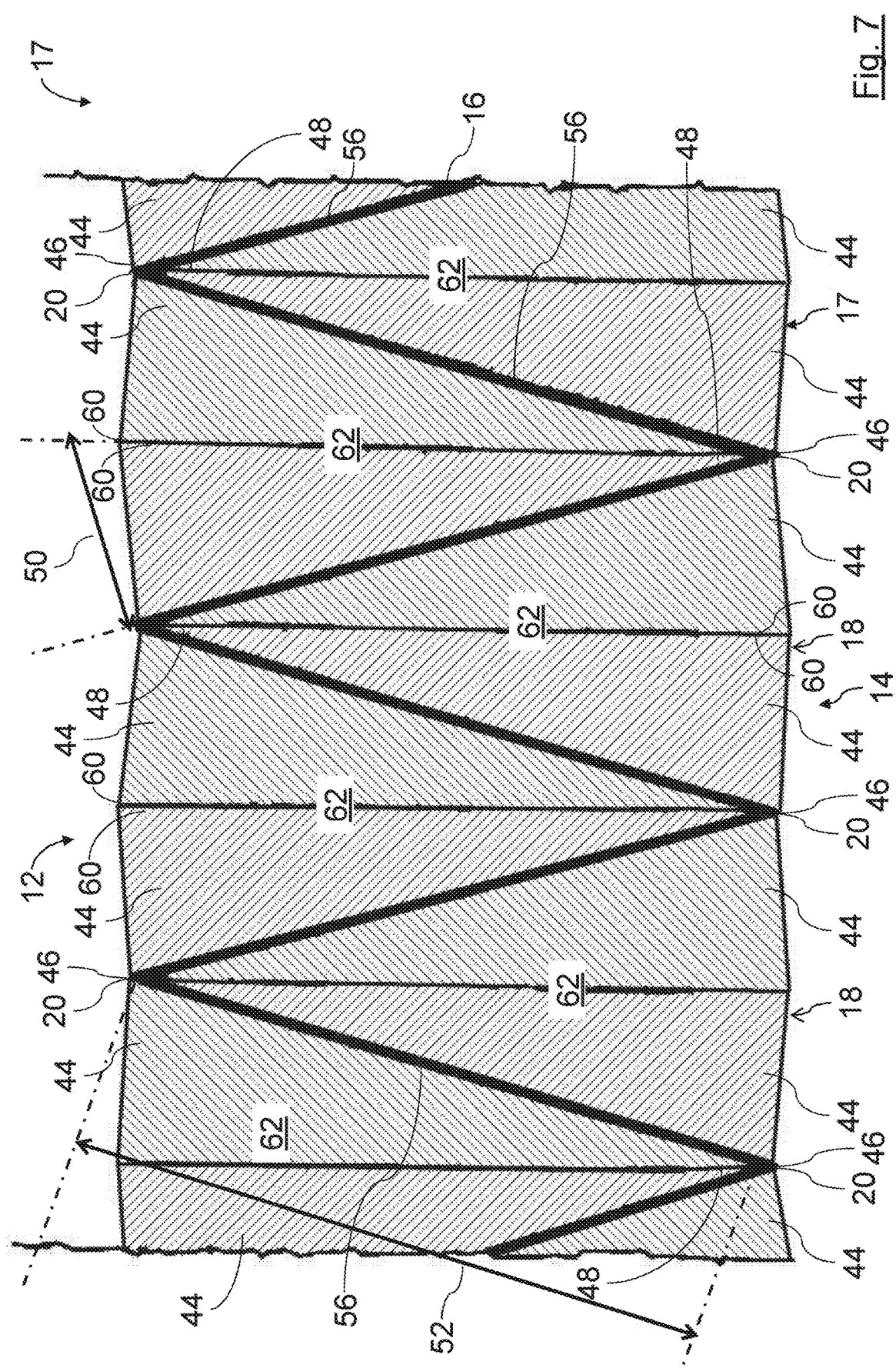
FIG. 7 is a section view of a detail of the filter bellows with the folded filter medium of FIGS. 3 to 6, in which free sides of oppositely positioned support glue beads in an intermediate fold space are resting areally against each other.

In FIG. 4, a detail of the stretched-out filter medium 16 of the filter bellows 17 prior to folding is shown in a side view. On one side of the filter medium 16 support sections 44 of hot melt are arranged. The hot melt can be, for example, based on polyamide, polyolefin, or ethylene vinyl acetate (EVA). The support sections 44 have an elongate shape. They extend perpendicular to the embossed fold edges 46. The positions of the fold edges 46 are indicated in FIG. 4 by dash-dotted lines. Upon subsequent erection of the folds 18 of the fold bellows 17, the filter medium 16 is folded along the fold edges 46. Along the fold edge 16 illustrated at the center in FIG. 4, a fold peak 20 is realized in the folded filter bellows 17 on the side of the filter medium 16 which is illustrated at the bottom in FIG. 4. On the opposite side of the filter medium 16, in FIG. 4 at the top, a fold base 48 of an intermediate fold space 62 located thereat, shown in FIGS. 5 and 7, is provided along the central fold edge 46. In case of the two outer fold edges 46 in FIG. 4, the fold peaks 20 and the fold bases 48 are each arranged in reverse.

The support section 44 of a fold 18 is substantially symmetrically embodied. A respective height extension 50 of the support sections 44 perpendicular to the surface of the filter medium 16, which as indicated in FIG. 4 by a double arrow, increases along its longitudinal extension 52, in FIG. 4 also indicated by a double arrow, in the direction from a fold base 48 to a fold peak 20 of the fold 18 of the filter medium 16. The height extension 50 describes the extension of a cross-sectional surface of the support section 44 at the highest point. A width extension of the support section 44 parallel to the surface of the filter medium 16 and perpendicular to its longitudinal extension 52 decreases in the direction from the fold peak 22 to the fold base 48 of the fold 18. In FIG. 4, above the left filter medium section 56 of the filter medium 16, exemplary cross-sections of the support section 44, illustrated below, that are taken at four section planes spaced apart form each other in the longitudinal direction of the support section 44 are illustrated. The respective width extension 54 of the cross-sections is indicated by double arrows, respectively. The width extension 54 describes the width of the cross-section of the support section 44 at its broadest point. The support sections 44 have in cross-section on their sides facing away from the filter medium 16 a somewhat elliptical course. On their side facing the filter medium 16 the support sections 44 in cross-section are flattened. A ratio of the height extension 50 of the cross-sections of the support sections 44 to their width extension 54 is approximately constant across the length extension. Preferably, the ratio of the height extension 50 to the width extension 54 is between approximately 1/5 and approximately 5/5. Preferably, it is greater than approximately 3/5. The two support sections 44 of the future intermediate fold space 62 are connected to each other in the area of the central fold edge 46 in FIG. 4. Also, the support sections 44 are connected with adjoining support sections, not shown in FIG. 4, of the neighboring intermediate fold spaces 62. The support edge sections 44 which are connected to each other can be referred to as continuous support edge sections which extend across the fold edges 46.

In FIG. 6, a detail of a support section 44 of the filter medium 16 of FIGS. 4 and 5 is illustrated in a perspective view. A cross-section of an alternative support section 144 with a smaller ratio of height extension 50 to width extension 154 is indicated therein with a dashed circumferential line and dashed crosshatching.

In FIG. 5, a detail of the filter medium 16 of FIG. 4 in a phase during erecting of the folds 18 is illustrated. The two filter medium sections 56 are folded along the fold edge 46 toward each other, which is indicated in FIG. 5 by two arrows 58. Erecting the folds 18 is done as long as the hot melt of the support sections 44 is still soft and adhesive. After erecting the folds 18, the free sides 60 of the support sections 44 which are facing away from the filter medium 16 are resting flat against each other in the intermediate fold space 62. This is illustrated in FIG. 7. The folds 18 each are V-shaped after erecting. The oppositely positioned sides 60 of the two support sections 44 upon erecting the folds 18 are pressed against each other and are adhesively connected in this way. The adhesive connection between the sides 60 is realized in the longitudinal direction of the support sections 44 along a narrow surface. Depending on the width extension 54 and the pressure onto the support sections 44, the adhesive connecting area is widened accordingly. The support sections 44 can be flattened in this way.

In the finish-folded filter bellows 17 which is illustrated in FIG. 7, in contrast to the one shown in FIGS. 4 and 5, both sides of the filter medium 16 are provided with corresponding support sections 44. The support sections 44 that are resting against each other support each other and secure in this way the folds 18 in the predetermined shape. Moreover, the support sections 44 prevent that the folds 18 will collapse. In other respects, the support sections 44 can have a beneficial effect on the flow course of the fluid in the intermediate fold spaces 62. The support sections 44, for example, can also be arranged in the area of the fold edges 46 of the filter bellows 17 such that they can seal the filter bellows 17 and thus the intermediate fold spaces 62 in outward direction.

Figure 9:
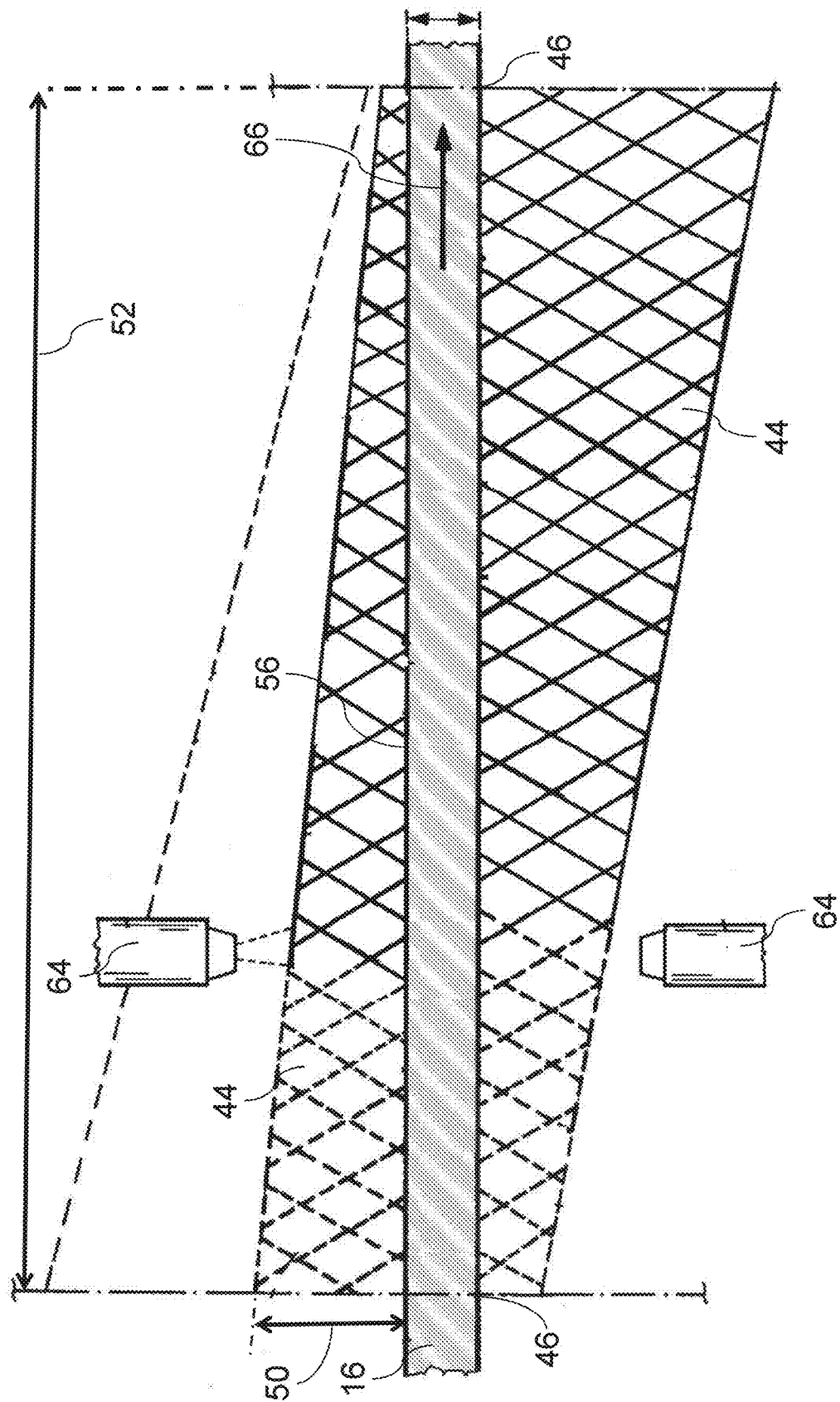
FIG. 9 shows schematically in section the filter medium, not folded, of the fold bellows of FIG. 4 on which support glue beads are applied by means of nozzles at the raw fluid side and the clean fluid side, respectively.

An example for an arrangement of the support sections 44 on opposite sides of the filter medium 16 is illustrated in FIG. 9. Here, a nozzle arrangement with two oppositely positioned nozzles 64 is illustrated also with which the hot melt for realizing the support sections 44 is sprayed onto the filter medium 16. In this connection, the web-shaped filter medium 16, indicated in FIG. 9 by arrow 66, is pulled through between the two nozzles 64. For better clarity, in FIG. 9 only a detail of the filter medium 16 between two neighboring fold edges 46 is illustrated which is indicated by a dotted line, respectively.

Figure 8:
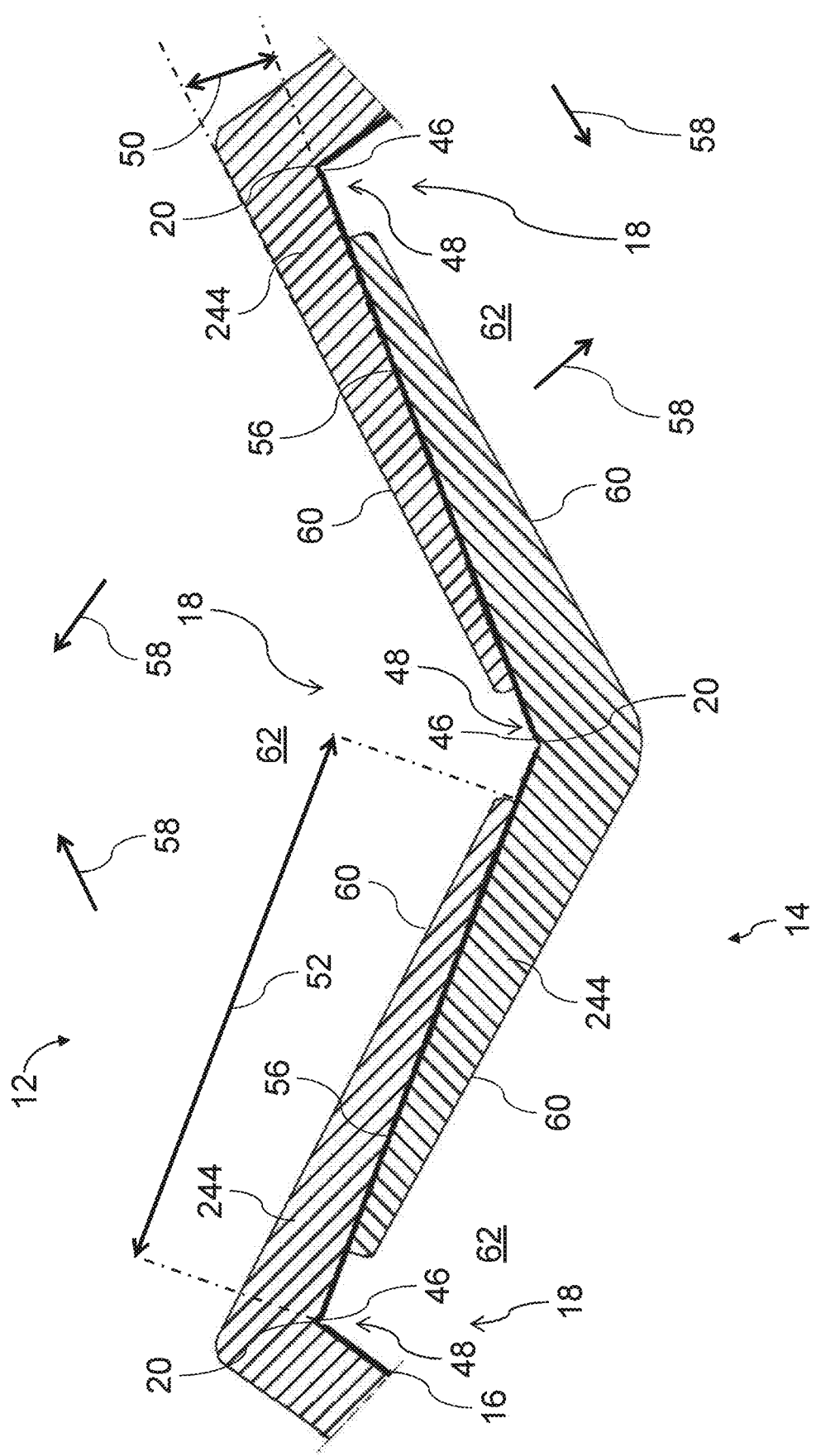
FIG. 8 shows a detail of a filter medium of a filter bellows according to a further embodiment after application of the support glue bead in a phase during erecting of the folds, wherein the support glue beads do not extend across fold edges in fold bases of the folds.

In FIG. 8, a detail of a further embodiment of the filter bellows 17 is illustrated in which in a production process the folds 16 have not yet been erected completely. In contrast to the embodiment of FIGS. 4 to 7, the support sections 244 in the embodiment of FIG. 8 end in the fold bases 48 at a spacing to the fold edges 46 provided thereat. When further erecting the folds 18, it is prevented in this way that excess adhesive will push apart the folds 18 in the area of the fold bases 48 which can cause bulging of the intermediate fold spaces 62. This would destroy the V-shape of the folds 18. At the side of the fold peaks 20, the support section 244 extends across the fold edges 46.

Figure 10:
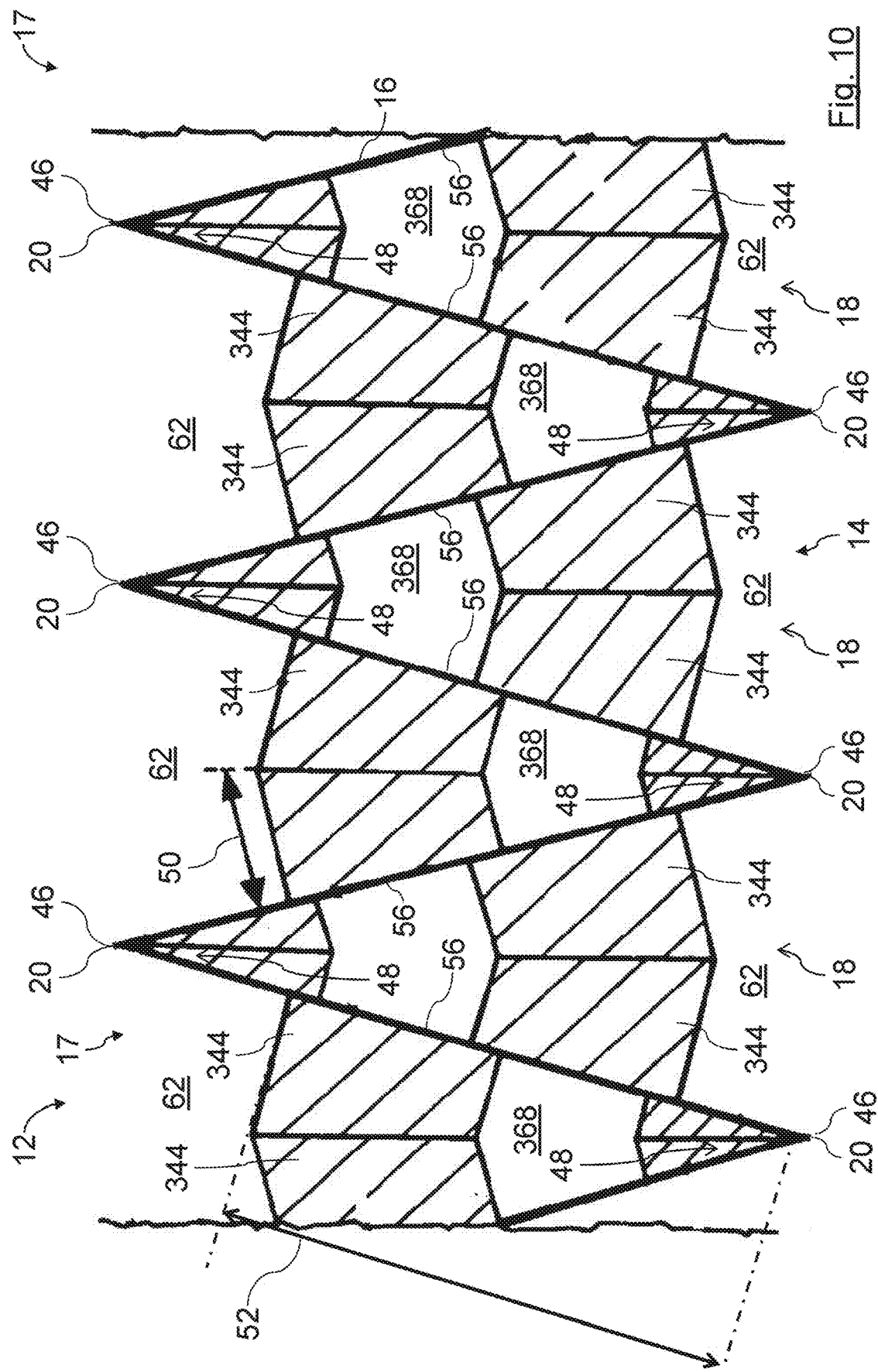
FIG. 10 shows schematically in section a detail of a further embodiment of a fold bellows similar to the fold bellows of FIG. 4 in which the support glue beads are interrupted in an intermediate fold space.

In FIG. 10, a detail of a further embodiment of a filter bellows 17 is illustrated. In contrast to the first embodiment of FIG. 7, in the second embodiment in FIG. 10 support sections 34 are interrupted in each intermediate fold space 62. The support sections 344 end also at a spacing to the fold peaks 20. Interruptions 368 of the support section 344 on the oppositely positioned sides of the filter medium 16, i.e., on the raw fluid side, the inflow side 12, and the clean fluid side, the outflow side 14, are staggered relative to each other. In this way, it is ensured that in the area of the fold peaks 20 as well as in the vicinity of the fold bases 48 an overlap of the support sections 44 at the clean fluid side and the raw fluid side is formed. At the raw fluid side and at the clean fluid side, segments of the support sections separated by the interruptions 368 are arranged such that one of the segments at the raw fluid side is projecting past an interruption 368 at the clean fluid side, respectively, in the direction of the longitudinal extension 52 at both ends and with its ends overlaps the segments of the support section 344 at the clean fluid side which border the interruption 368 located thereat. One of the segments of a support section 344 at the clean fluid side projects past the interruption 368 at the raw fluid side on both ends and overlaps with its ends the segments of the support section 344 at the raw fluid side which border the interruption 368 located thereat.

In all of the described embodiments of a filter element 10 and of a filter, inter alia the following modifications are possible.

The invention is not limited to air filter elements for internal combustion engines of motor vehicles. Instead, it can also be used in other kinds of internal combustion engines, for example, industrial motors. The invention can also be used outside of automotive technology. The filter element 10 can be used also for filtration of other fluids, for example, oil, fuel or water.

The support sections 44; 144; 244; 344 can be provided at least on their side facing away from the filter medium with a differently shaped, for example, circular-shaped course, instead of an elliptical one.

Instead of resting on an oppositely positioned support section 44; 144; 244; 344, the support sections 44; 144; 244; 344 can also rest with their free sides 60, which are facing away from the respective filter medium section 56, also on the surface of the filter medium section 56 oppositely positioned in the intermediate fold space 62 and can be glued thereto.

Instead of a hot melt, also another kind of adhesive can be used for realizing the support sections 44; 144; 244; 344. Instead of an adhesive, also another kind of material, in particular a formable material for the purpose of application, can be used for realizing the support sections 44; 144; 244; 344.

The hot melt can also be foamed. The support sections 44; 144; 344; 244 can thus be comprised to 50% of hot melt and 50% of foamed-in gas. More than 50% of foamed-in gas can be provided also.

The ratio of height extension 50 to width extension 54 of the support sections 44; 144; 244; 344 in a cross-sectional plane may also vary in the direction of the length extension 52.

The folds 18 of the filter bellows 17, instead of being V-shaped, can also be shaped differently, for example, U-shaped. The folds 18 in the area of the fold bases 48 can also be stepped. In an area of the respective fold base 48, a V-shape can be provided that progressively widens away from the corresponding fold edge 46. Adjoining the V-shaped area, the oppositely positioned filter medium sections 56 that delimit an intermediate fold space 62 of the fold 18 can extend parallel to each other.

In the embodiment of FIG. 10, the interruptions 368 can also be arranged differently. Fewer or more interruptions may also be provided. The support sections 344 can also extend across the corresponding fold peaks 20. The fold bases 48 may also be free of support sections 344.

While specific embodiments of the invention have been shown and described in detail to illustrate the inventive principles, it will be understood that the invention may be embodied otherwise without departing from such principles.

What is claimed is:

1. A method of manufacturing a filter element of a filter for filtering fluids, wherein
the filter element comprises:
a zigzag-folded filter medium provided with a raw fluid side and a clean fluid side,
wherein the filter medium comprises fold edges and filter medium sections extending between the fold edges, respectively,
wherein two of the filter medium sections joined by one of the fold edges define an intermediate fold space, respectively, wherein the intermediate fold space defines a fold base and fold peaks at ends of the two filter medium sections opposite the fold base;
the filter element having:
an elongate support section arranged in the intermediate fold space on a filter medium surface of the filter medium sections of the intermediate fold space at the raw fluid side or the clean fluid side;
the method comprises the steps of
providing an adhesive;
providing a sheet of filter medium;
applying the adhesive using a nozzle in the intermediate fold space onto the filter medium section to form the at least one elongate support section such that the elongate support section has a width extension extending in a direction parallel to the fold edges, moving the nozzle to form the at least one elongate support section to extend at a slant or perpendicular to the fold edges between the fold base and the fold peak of said one filter medium section,
wherein the step of moving the nozzle includes interrupting the applying to form an interruption in the longitudinal direction on the respective filter medium section such that the elongate support section on the respective filter medium section is divided into two portions;
wherein the width extension decreases parallel to the filter medium surface and perpendicular to the longitudinal direction in the direction from the fold peak of said one filter medium section to the fold base;
folding the filter medium to form the fold edges of the filter medium sections, the filter medium sections delimited by and extending between the fold edges; and
curing the adhesive to harden the at least one elongate support section.

2. The method according to claim 1, wherein
after the step of folding the filter medium, the adhesive is uncured, the method further comprises:
flattening a portion of the uncured adhesive of the at least one support section by pressing the uncured adhesive against the filter medium section.

3. The method according to claim 1, wherein
the step of moving the nozzle includes
extending the elongate support section across at least one fold edge onto an adjacent filter medium section.

4. The method according to claim 1, wherein
in the step of moving the nozzle, the applying of the adhesive is interrupted at the fold base such the elongate support section at the fold base does not continue across the fold edge located at the fold base.

5. The method according to claim 1, wherein
in the folding step, the filter medium is folded into V-shaped folds.

6. The method according to claim 5, wherein
wherein in the folding step, two of said at least one elongate support sections are provided;
wherein said elongate support sections are positioned opposite each other in the intermediate fold space on adjacent filter medium sections;
wherein the method further includes:
positioning the free sides of said elongate support sections to rest directly on each other.

7. The method according to claim 6, wherein
the elongate support section has a first side on the filter medium of the filter medium section and an opposite free side positioned furthest from the filter medium section;
wherein the positioning step includes:
in the intermediate fold space, the free sides of said elongate support sections rest directly on each other are glued together.

8. The method according to claim 6, wherein
the elongate support section has a first side on the filter medium of the filter medium section and an opposite free side positioned furthest from the filter medium section;
wherein in the positioning step:
the free sides of said elongate support sections that are resting directly against each other have areal contact with each other in the direction of the width extension and in the direction of the length extension.

9. The method according to claim 6, wherein
the elongate support section has a first side on the filter medium of the filter medium section and an opposite free side positioned furthest from the filter medium section;
wherein in the positioning step:
the first side of the elongate support section resting on a filter medium surface of the filter medium section is positioned opposite the elongate support section in the intermediate fold space.

10. The method according to claim 1, wherein
the elongate support section has a first side on the filter medium of the filter medium section and an opposite free side positioned furthest from the filter medium section;
the first side of the elongate support section is glued to said filter medium surface of the filter medium section positioned opposite the elongate support.

11. The method according to claim 1, wherein several of the elongate support section are provided on opposite sides of the filter medium; wherein the interruptions of the opposite elongate support sections positioned on said opposites sides are staggered relative to each other, wherein the method further includes: positioning the free sides of said elongate support sections to rest directly against each other.

12. The method according to claim 11, wherein
the positioning step includes:
in the intermediate fold space, the free sides of said elongate support sections rest directly on each other and are glued together.

13. The method according to claim 1, wherein
in the applying step, the adhesive is a polyamide-based hot melt adhesive, a polyolefin-based hot melt adhesive, or an ethylene vinyl acetate-based hot melt adhesive.

14. The method according to claim 1, wherein
in the applying step, the adhesive is a foamed adhesive.

15. The method according to claim 1, wherein
a pair of adjacent fold edges divide the filter medium into a respective filter medium section bordered by the pair of adjacent folded edges;
wherein, in the step of moving the nozzle, the elongated support section is formed to have two legs:
a first leg arranged directly on a respective first filter medium section, the elongated support section extending across a first fold peak bordering the respective filter medium section and continuing to the second leg arranged directly on an adjacent second filter medium section also bordered by the first fold peak;
wherein the elongated support section stops before and is spaced away from the fold bases bordering the first and second filter medium sections.

16. The method according to claim 1, wherein
in the applying and moving the nozzle steps, the elongated support section is arranged on the zigzag folded filter medium on the clean fluid side of the filter medium; and
a second elongated support section is arranged on the zigzag folded filter medium on the raw fluid side of the filter medium;
wherein the second elongated support section has a first leg arranged directly over a second leg of the elongated support section;
wherein a second leg of the second elongated support section is arranged directly over a leg of a different third elongated support section arranged on the zigzag folded filter medium on the clean fluid side of the filter medium;
wherein the second elongated support section stops before and is spaced away from the fold bases.

17. The method according to claim 1, wherein
in the step of providing an adhesive, the adhesive is a hot melt, the step further including foaming the hot melt adhesive before practicing the applying step.

18. The method according to claim 1, wherein
in the moving step, the at least one elongate support section is formed as tapered such that:
the width extension decreases parallel to the filter medium surface and perpendicular to the longitudinal direction in the direction from the fold peak of said one filter medium section to the fold base; and
simultaneously, a height extension of the at least one elongate support section decreases perpendicular to the filter medium surface and perpendicular to the longitudinal direction in the direction from the fold peak of said one filter medium section to the fold base.

19. The method according to claim 18, wherein
an application rate with which the adhesive of the support section is applied onto the filter medium through the nozzle is varied in the longitudinal direction from the fold peak to the fold base to taper the at least one elongate support section.

20. A method of manufacturing a filter element of a filter for filtering fluids, wherein
the filter element comprises:
a zigzag-folded filter medium provided with a raw fluid side and a clean fluid side,
wherein the filter medium comprises fold edges and filter medium sections extending between the fold edges, respectively,
wherein two of the filter medium sections joined by one of the fold edges define an intermediate fold space, respectively, wherein the intermediate fold space defines a fold base and fold peaks at ends of the two filter medium sections opposite the fold base;
the filter element having:
an elongate support section arranged in the intermediate fold space on a filter medium surface of the filter medium sections of the intermediate fold space at the raw fluid side or the clean fluid side;
the method comprises the steps of
providing an adhesive;
providing a sheet of filter medium;
applying the adhesive using a nozzle in the intermediate fold space onto the filter medium section to form the at least one elongate support section such that the elongate support section has a width extension extending in a direction parallel to the fold edges,
moving the nozzle to form the at least one elongate support section to extend at a slant or perpendicular to the fold edges between the fold base and the fold peak of said one filter medium section;
wherein the width extension decreases parallel to the filter medium surface and perpendicular to the longitudinal direction in the direction from the fold peak of said one filter medium section to the fold base;
folding the filter medium to form the fold edges of the filter medium sections, the filter medium sections delimited by and extending between the fold edges; and
curing the adhesive to harden the at least one elongate support section;
wherein in the moving step, the at least one elongate support section is formed as tapered such that:
the width extension decreases parallel to the filter medium surface and perpendicular to the longitudinal direction in the direction from the fold peak of said one filter medium section to the fold base; and
simultaneously, a height extension of the at least one elongate support section decreases perpendicular to the filter medium surface and perpendicular to the longitudinal direction in the direction from the fold peak of said one filter medium section to the fold base;
wherein the at least one elongate support section is formed as tapered such that a ratio of the height extension to the width extension is constant and between 3/5 to 5/5.

\* \* \* \* \*